(12) United States Patent
Jiang et al.

(10) Patent No.: US 7,442,938 B2
(45) Date of Patent: Oct. 28, 2008

(54) X-RAY DETECTOR FABRICATION METHODS AND APPARATUS THEREFROM

(75) Inventors: Haochuan Jiang, Brookfield, WI (US); David Michael Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/623,730

(22) Filed: Jan. 16, 2007

(65) Prior Publication Data

US 2008/0169418 A1  Jul. 17, 2008

(51) Int. Cl.
*G01T 1/20* (2006.01)

(52) U.S. Cl. .................... 250/368; 250/361 R
(58) Field of Classification Search .................. 250/368, 250/361 R
See application file for complete search history.

(56) References Cited

U.S. PATENT DOCUMENTS

| | | | |
|---|---|---|---|
| 5,336,889 A | | 8/1994 | Hofstetter |
| 5,484,750 A | * | 1/1996 | Greskovich et al. ............ 501/86 |
| 5,786,599 A | * | 7/1998 | Rogers et al. ............. 250/483.1 |
| 6,310,358 B1 | | 10/2001 | Zur |
| 6,583,419 B1 | | 6/2003 | Moy et al. |
| 6,876,711 B2 | | 4/2005 | Wallace et al. |
| 6,900,442 B2 | | 5/2005 | Zur |
| 6,979,499 B2 | | 12/2005 | Walck et al. |
| 7,067,815 B2 | | 6/2006 | Dorenbos et al. |
| 7,067,816 B2 | | 6/2006 | Dorenbos et al. |
| 7,076,020 B2 | | 7/2006 | Kanai et al. |

* cited by examiner

*Primary Examiner*—Constantine Hannaher
*Assistant Examiner*—Mark R Gaworecki
(74) *Attorney, Agent, or Firm*—Fisher Patent Group, LLC; Thomas M. Fisher

(57) ABSTRACT

A detector includes a reflector and a scintillator in optical communication with the reflector, wherein both the reflector and the scintillator are fabricated from the same material.

9 Claims, 7 Drawing Sheets

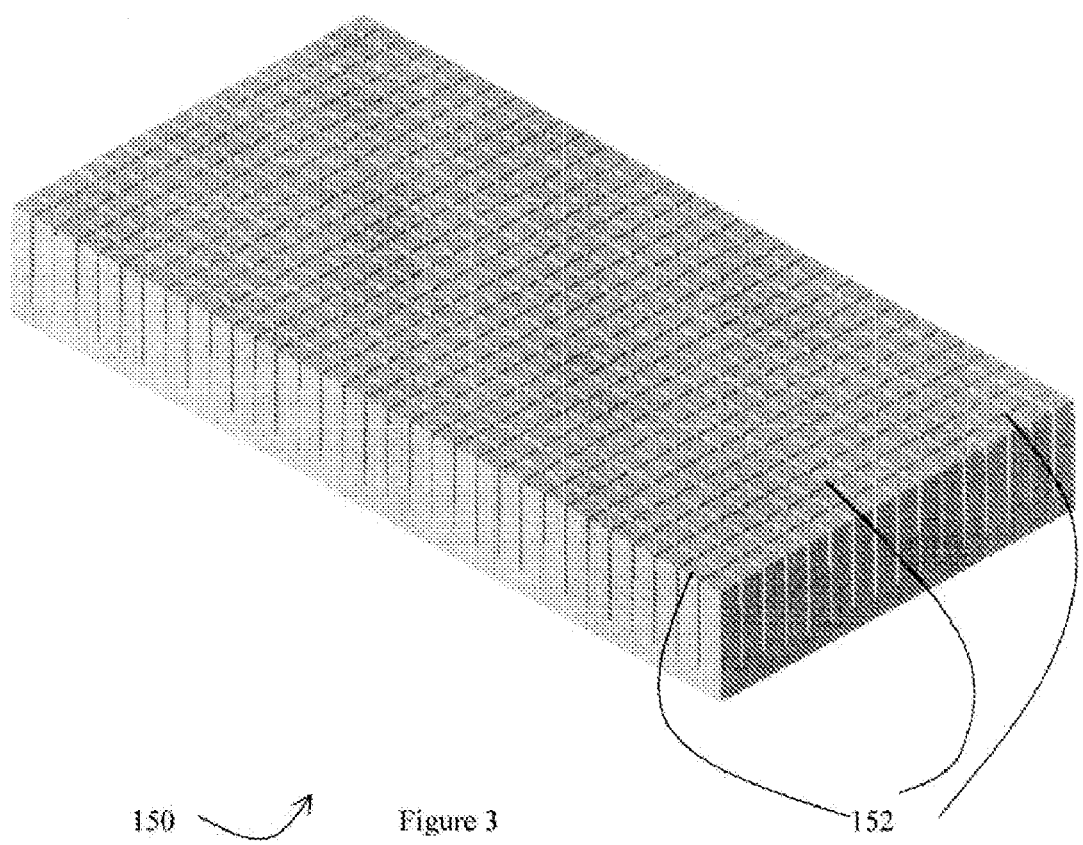
150 ↗  Figure 3  152
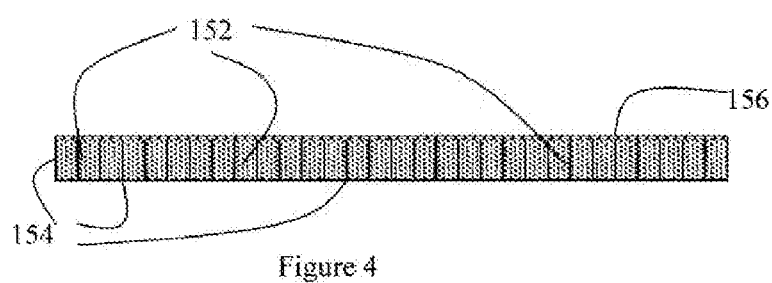
Figure 4

160

X-RAY DETECTOR FABRICATION METHODS AND APPARATUS THEREFROM

BACKGROUND OF THE INVENTION

This invention relates generally to imaging methods and apparatus, and more particularly, to methods that provide for improvements in x-ray detector fabrication and resulting apparatus.

X-ray detectors typically include a photodiode portion and a scintillator portion. An x-ray enters the detector and impinges the scintillator material, wherein photons of visible light are created. The visible light then leaves the scintillator material and impinges a photodiode. The photodiodes are polled, returning attenuation measurements. This data is then used to create images. Each scintillator pixel has a corresponding photodiode, and it is desirable that all light generated in the scintillator be directed toward the photodiode, therefore reflective material is used to reflect light directed in directions other than the photodiode direction. In other words, one can imagine a scintillator cell as a six sided cube, with one side facing the photodiode and the five other sides having reflective material. The side opposite the photodiode is termed the top side.

One known scintillator array (commonly called a "cast pack") used in Computed Tomography (CT) uses a cast reflector coating as its light reflector. The reflector is epoxy filled with a highly reflective powder such as $TiO_2$. The cast reflector coating typically mechanically bounds the scintillator pixels together to form an array and the cast reflector coating also reflects the light back into the pixels from the surface. This reflector is important for light collection efficiency purposes. One problem in the known reflector process is the curing shrinkage of the epoxy and the thermal expansion mismatch between the reflector and the ceramic scintillator pixels. The reflector has about 70% to 80% epoxy in volume. After curing, the epoxy will shrink by more than 5% in volume. While it shrinks, the adhesion is already being developed between the ceramic and reflector. This shrinkage causes very high stress on the interface and also inside the ceramic pixels. This stress can lead to cracks of the ceramic pixels, and delamination between the reflector and ceramic pixels. A wire saw is typically used to perform geometric dicing and pixelating of the packs before the casting, and this shrinkage problem becomes more damaging. The curing stress can cause the packs to bow along both the X and the Z directions. This in turn can cause the pixels to tilt and can cause pixel misalignment. The bowing can also cause other process related problems because of the lack of the flatness of the packs.

Therefore, below are described methods and apparatus that at least partially solve the above described problems.

BRIEF DESCRIPTION OF THE INVENTION

In one aspect, a detector includes a reflector and a scintillator in optical communication with the reflector, wherein both the reflector and the scintillator are fabricated from the same material.

In another aspect, a method includes creating a compound, and using the compound both as a scintillator and as a reflector.

In yet another aspect, a CT system includes an x-ray source configured to emit x-rays, an x-ray detector positioned to receive x-rays emitted by the source, and a computer operationally coupled to the source and detector, the detector including a reflector and a scintillator in optical communication with the reflector, wherein both the reflector and the scintillator are fabricated from the same material.

BRIEF DESCRIPTION OF THE DRAWINGS

FIG. 3 illustrates a scintillator array including a plurality of pixels.
FIG. 4 illustrates a side view of the array shown in FIG. 3.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all diagnostic imaging systems, all current modalities and/or any modality yet to be developed in which scintillators and reflectors are used.

Herein described is a reflector fabricated from a porous ceramic material that has the same composition as the scintillator. The ceramic reflector has no cure-related shrinkage and very small if any thermal expansion mismatch with the ceramic scintillator pixels, so using a ceramic reflector can solve all the cure shrinkage related problems experienced by the known pack manufacturing process. The use of a ceramic reflector can also reduce the x-ray punch-through and some of the x-ray caused crosstalk between the pixels.

Figure 1:
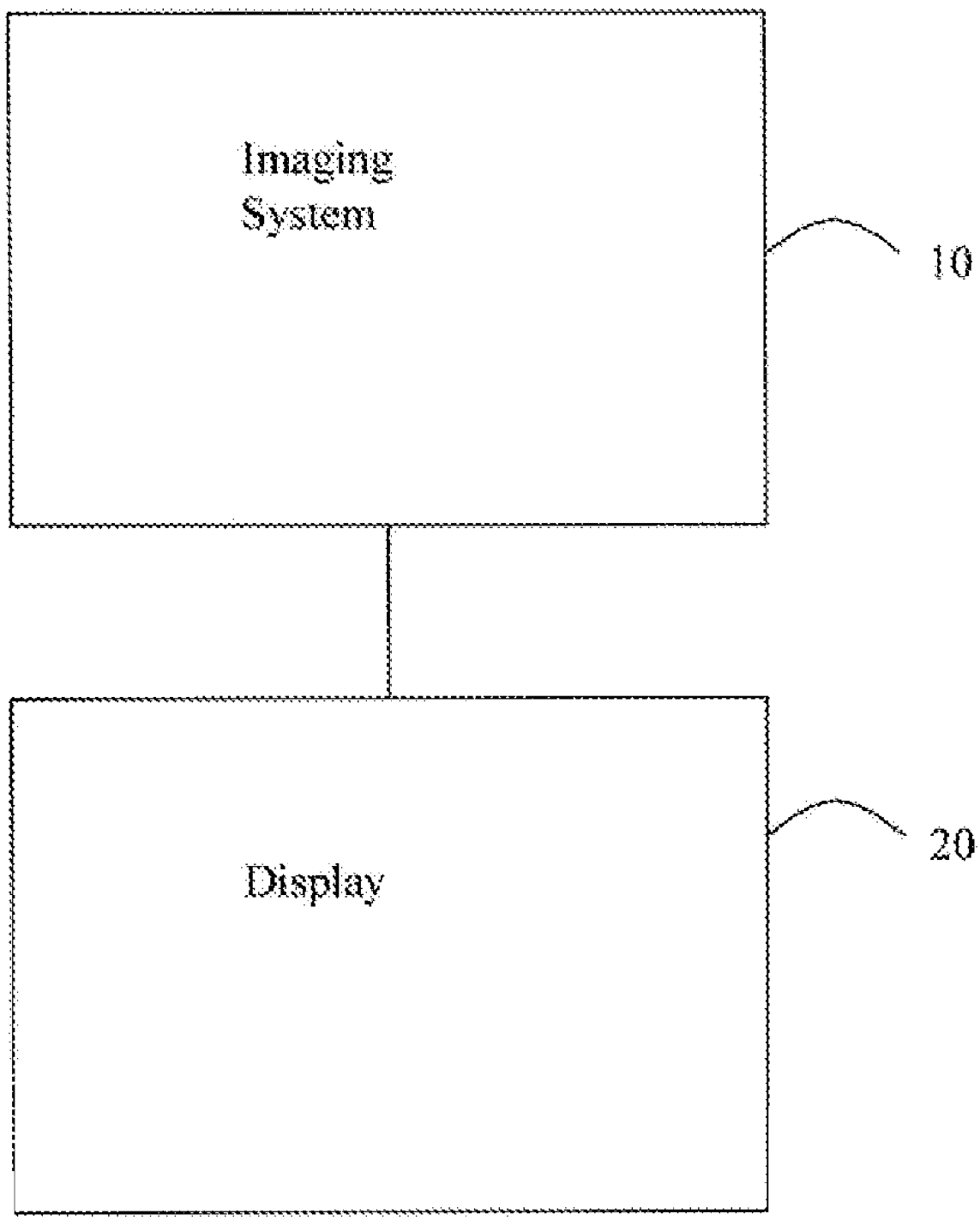
FIG. 1 illustrates an exemplary diagnostic imaging system.

FIG. 1 illustrates an imaging system 10 with an associated display 20. Imaging system 10 can be of any modality, but in one embodiment, system 10 is a CT system. In another embodiment, system 10 is a dual modality imaging system such as a combined CT/PET system and data can be acquired in one modality (e.g., CT) and the processed data can be transferred to the other modality (e.g., PET). Display 20 can be separate from system 10 or integrated with system 10. System 10 includes an acquisition device such as an x-ray radiation detector.

It is contemplated that the benefits of the invention accrue to human and non-human imaging systems such as those systems typically employed in small animal research. Also, it is contemplated that the benefits of the invention accrue to non-medical imaging systems such as those systems typically employed in an industrial setting or a transportation setting, such as, for example, but not limited to, a baggage scanning CT system for an airport or other transportation center as shown in FIG. 2.

Figure 2:
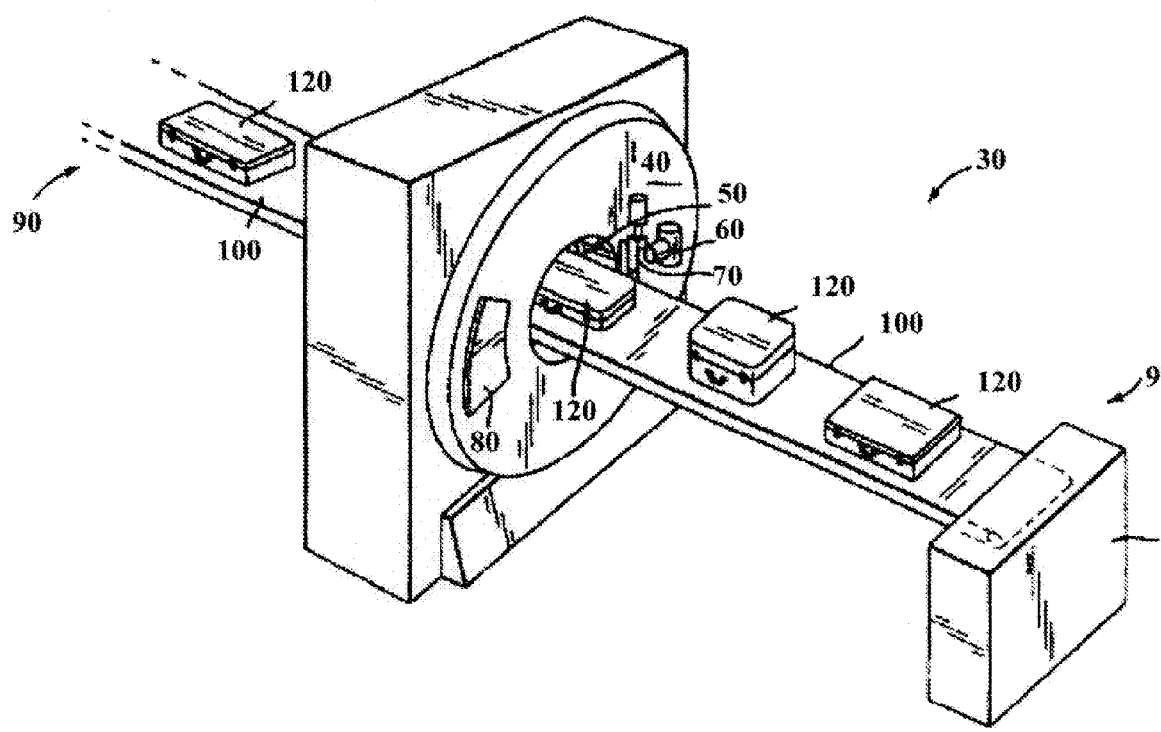
FIG. 2 illustrates a package/baggage inspection system.

Referring now to FIG. 2, a package/baggage inspection system 30 includes a rotatable gantry 40 having an opening 50 therein through which packages or pieces of baggage may pass. The rotatable gantry 50 houses a high frequency electromagnetic energy source 60 aligned with an attenuation filter 70 as well as a detector assembly 80. A conveyor system 90 is also provided and includes a conveyor belt 100 supported by structure 110 to automatically and continuously pass packages or baggage pieces 120 through opening 50 to be scanned. Objects 120 are fed through opening 50 by conveyor belt 100, imaging data is then acquired, and the conveyor belt 100 removes the packages 120 from opening 50 in a controlled and continuous manner. As a result, postal inspectors, baggage handlers, and other security personnel may non-invasively inspect the contents of packages 120 for explosives, knives, guns, contraband, and the like.

FIG. 3 illustrates a scintillator array 150 including a plurality of pixels 152. FIG. 4 illustrates a side view of array 150 with reflector material 154 between pixels 152. FIG. 4 also shows a top reflector 156. Energy in the form of x-rays impinge top reflector 156, the energy travels through pixel 152 being converted to optical photons before the energy impinges a photodiode that would be positioned beneath the array shown in FIG. 4. Reflector material 154 provides for reflecting light not directed toward the photodiode or the top reflector 156. Top reflector 156 reflects light directed toward it. Top reflector 156 can be the same material as reflector material 154, or can be different as described below. In one embodiment, the reflector will be of the same composition as the scintillator itself. Therefore for one scintillator pack, the reflector composition will be $Y_{1.33}Gd_{0.66}Eu_{0.01}O_3$:Pr (or more generically, Y—Gd—Eu—O:Pr). The reflector composition for a GOS scintillator packs can be $Gd_2(S,O)_2$:Ce,Tb (or more generic, GD—(S,O)—Ce—Tb). One specific composition of the reflector for using a Lu—Tb—Al—O:Ce material in a scintillator pack could be $Lu_{0.8}Tb_{2.2}Al_5O_{12}$:Ce.

Figure 5:
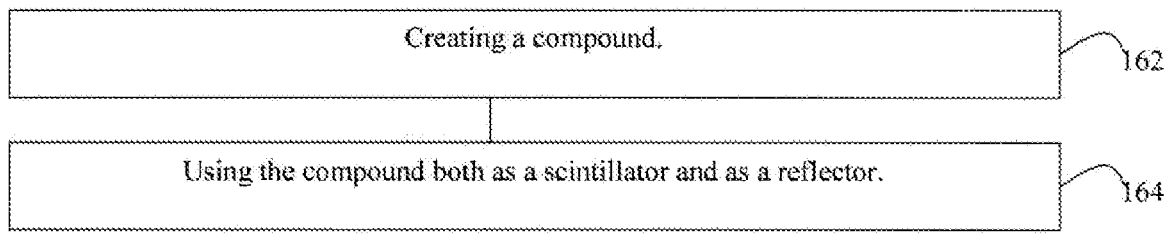
FIG. 5 illustrates a method.

FIG. 5 illustrates a method 160 that can include the step of creating a compound at 162, and using the compound both as a scintillator and as a reflector at 164. One key point here is to use the same composition scintillator powder as the reflector material, but the powder for the reflector will be milled into smaller particle size and the reflector will be made porous to scatter most of the light and reduce cross-talk between pixels as described in more detail below.

Figure 6:
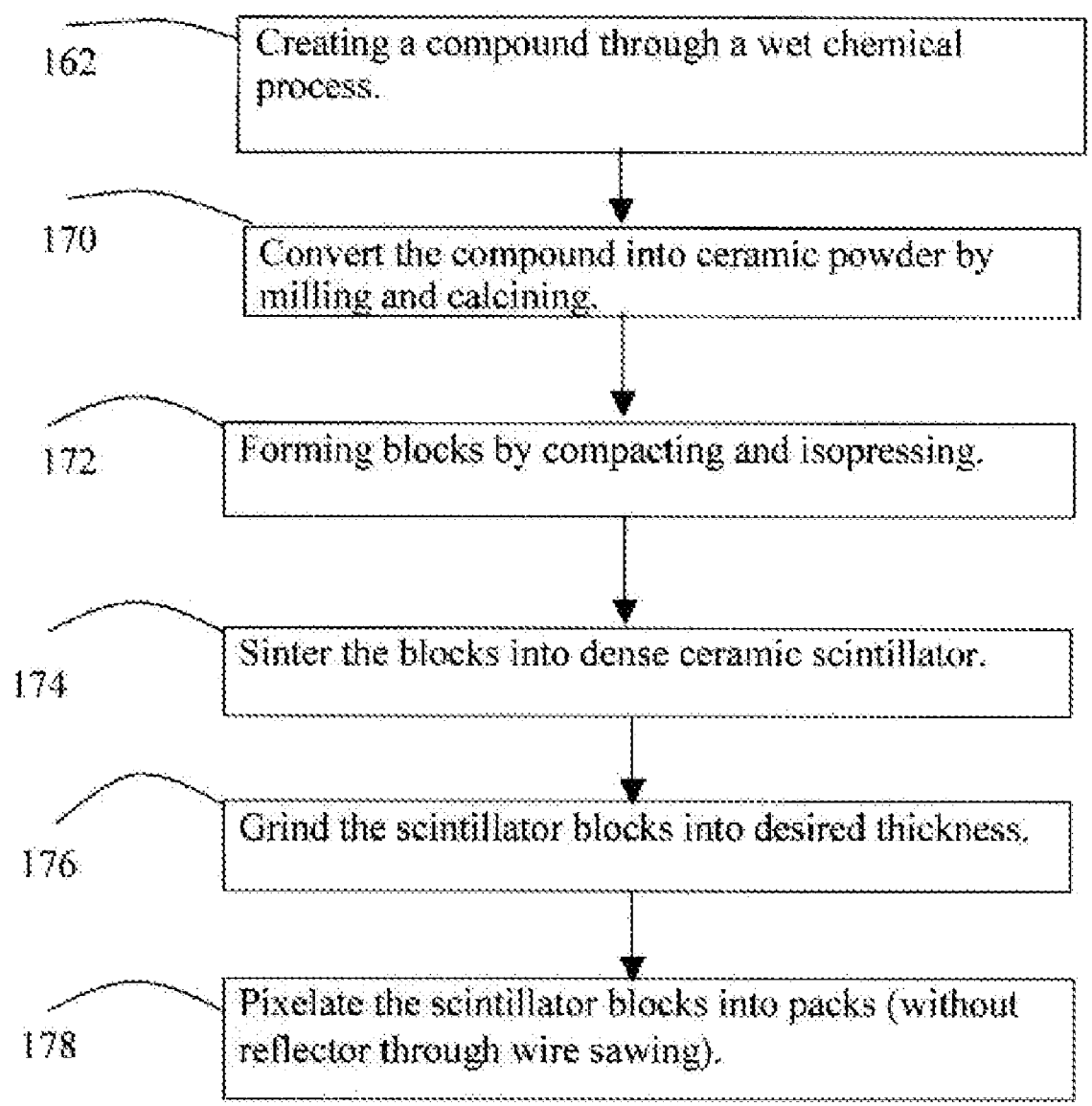
FIG. 6 illustrates that the method of FIG. 5 can include creating a compound for the scintillator portion through a wet chemical process.

FIG. 6 illustrates that method 160 can include creating 162 a compound through a wet chemical process. For instance in the Y—Gd—Eu—O:Pr system, one can synthesize the compound by dissolving the oxide powder $Gd_2O_3$, $Y_2O_3$, $Eu_2O_3$, and $Pr_4O_7$ in nitric acid to form a nitrate solution. The nitrate solution is then mixed with oxalic acid solution to form oxalate slurry. The slurry is then filtered and washed with DI water to obtain a wet cake. The wet cake is then dried and jet milled into fine oxalate powder with a particle size of 1 to 3 microns at step 170. The oxalate powder is then calcined in air at about 900° C. to 1000° C. to form an oxide powder. This powder is then used to make the scintillator ceramic blocks directly or used to make the corresponding reflector to make the final cast scintillator packs. First the calcined powder are compacted into blocks and sintered in hydrogen at about 1900° C. to achieve full transparency at steps 172 and 174. The sintered blocks are then ground at step 176 and wire saw cut into pixilated packs for further processing into final cast packs at step 178. This completes one sub-assembly process.

Figure 7:
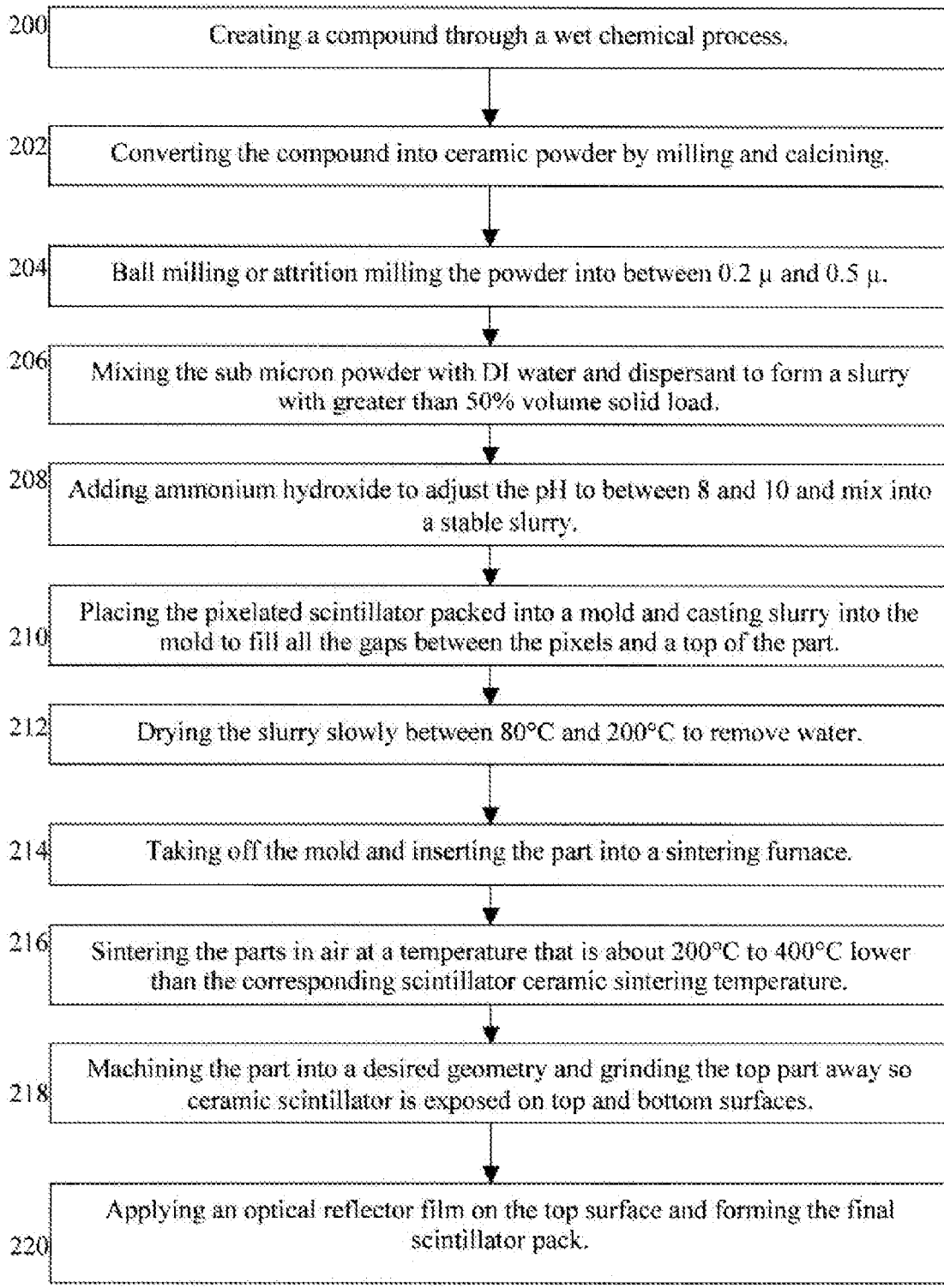
FIG. 7 illustrates the compound for the reflector portion is created through the same wet chemical process in FIG. 6.

The above calcined powder can also be used to make the reflector material for the above pixilated packs resulting from the steps in FIG. 6. Referring now to FIG. 7, the compound is created through a wet chemical process at step 200, and milled and calcined at step 202 just like steps 162 and 170 of FIG. 6. The calcined powder is further ball milled or attrition milled at step 204 into a submicron powder with a particle size of between about 0.2 to 0.5 micron. In other embodiments, the ranges are different, for example, 0.1 micron to 0.4 micron, and 0.3 micron to 0.8 micron. The milled powder is then mixed at step 206 with DI water and a dispersant such as Darven C that is commercially available from the R. T. Vanderbilt Company of Norwalk, Conn. The solid load is defined as the percentage of the solid volume in the total mixture. For the reflector material, the solid load is greater than 50%. The addition of Darven C is usually less than 1% in weight. After the initial mixing, some ammonium hydroxide is added to adjust the pH value of the mixture at step 208. The pH value usually is between about 8 to 10 depending on the powder used. By adjusting the pH, a stable slurry is formed.

Figure 8:
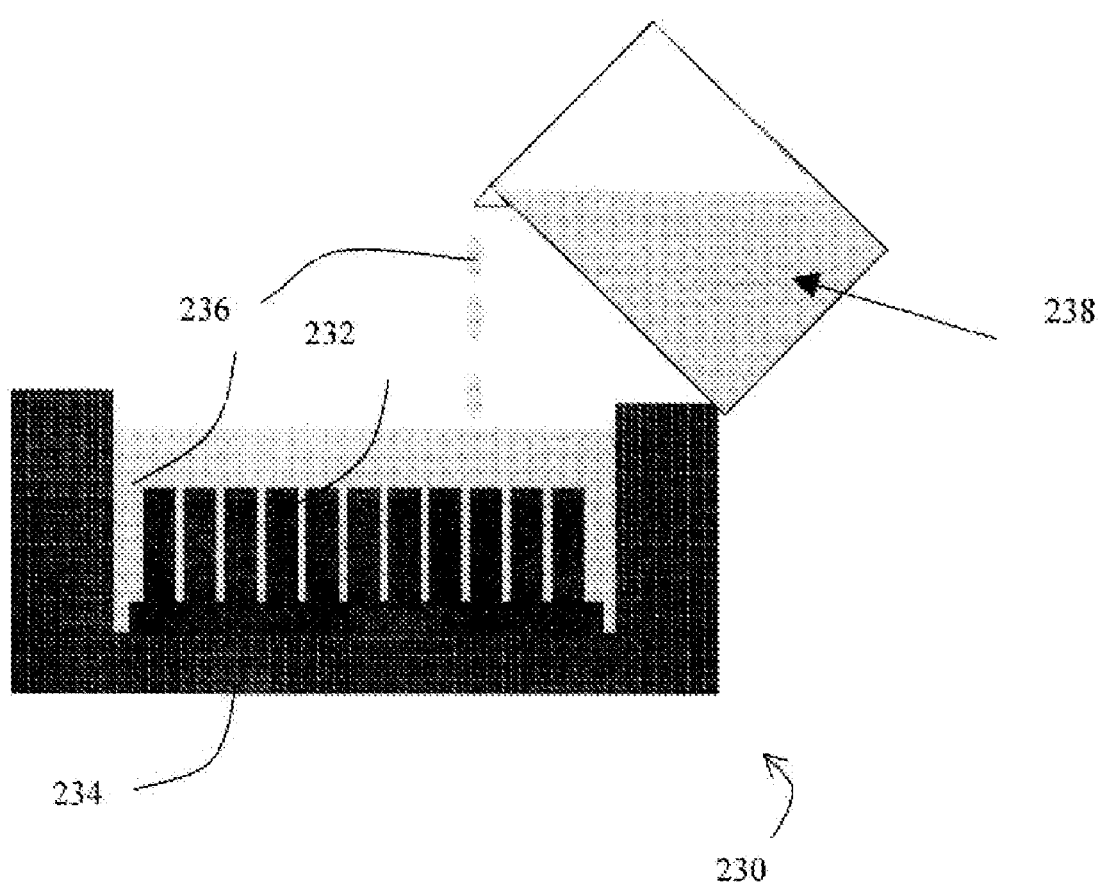
FIG. 8 illustrates the reflector material being applied to a scintillator sub-assembly.

A pixilated scintillator pack 232 made at least partially in accordance with the steps listed in FIG. 6 is then placed into a mold 234 as shown in FIG. 8 and the slurry 236 is cast into the mold at step 210. The slurry may be delivered via a beaker 238 or a pipe, using a robot, or any known method for moving liquids. Then the mold with the part therein is dried slowly to remove the water at step 212. The drying temperature is usually 80° C. to 200° C. After drying the part is removed out of the mold at step 214 and sintered at step 216 at a second lower temperature that is 200° C. to 400° C. lower than the corresponding scintillator ceramic sintering temperature. For the Y—Gd—Eu—O—Pr system the second sintering temperature is usually 1500° C. to 1700° C. The second sintering is usually done in air. By sintering at this lower temperature the powder between the pixels will be solidified and have proper strength to hold the pixels together, but it will retain enough porosity to increase the scattering power and reduce the cross-talk between pixels. After the second sintering the part is then machined at step 218 in the desired dimensions. Both the top surface and the bottom surface are ground so the scintillator pixel surface is exposed on both sides. Then an optical film is applied on the top surface to form the final cast scintillator packs at step 220, because in order to facilitate the prevention of any x-ray photon loss and light output loss, the top reflector may not be the ceramic material described above (although in one embodiment, no film is used). After sintering of the reflector, the top surface (the x-ray incoming surface opposite the photodiode face) is machined away and then an optical reflector film is applied. The film may be an opticlad film commercially available from Optical Polymer Research, Inc. of Gainesville, Fla. Another alternative is use epoxy/$TiO_2$ cast reflector to form the top reflector by casting, curing, and machining to the final thickness on the top.

The herein described methods and apparatus will allow for relatively minimal curing related shrinkage. Thus, there is little or none pack bowing and/or delamination. Although one embodiment uses 64 slices, the ideas herein expressed are expendable to longer packs beyond 64 slices. The methods and apparatus herein described allow for less stress due to better thermal expansion matching of the reflector and the scintillator ceramics. Also empirical results have shown in the herein provided methods and apparatus allow for lower radiation damage than known epoxy based reflector methods and apparatus.

Also provided herein is lower x-ray caused crosstalk due to the higher density of reflector. There is also an higher light output due to the extra light generated by the scintillator powder in the reflector.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Technical effects include that the herein described methods and apparatus allow for a CT scintillator array (pack) using the same composition ceramic as a reflector.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A detector comprising:
a reflector; and
a scintillator in optical communication with said reflector, both said reflector and said scintillator are fabricated from the same material wherein said material is milled to a sub micron size, and comprises at least one of Y—Gd—Eu—O:Pr, Gd—S—O—Ce—Tb, and Lu—Tb—Al—O:Ce.

2. A detector in accordance with claim 1 wherein said material is ball milled.

3. A detector in accordance with claim 1 wherein said material is attrition milled.

4. A method comprising:
creating a compound comprising at least one of Y—Gd—Eu—O:Pr, Gd—S—O—Ce—Tb, and Lu—Tb—Al—O:Ce, wherein said compound is milled to a sub micron size; using the compound both as a scintillator and as a reflector; and
applying an optical reflector film to a top reflector surface.

5. A method in accordance with claim 4 further comprising adjusting the PH of the compound by adding ammonium hydroxide solution.

6. A method in accordance with claim 5 further comprising making a slurry that will achieve at least a 50% solid load.

7. A method in accordance with claim 6 further comprising drying the slurry at a first temperature and then sintering at a second temperature.

8. A CT system comprising:
an x-ray source configured to emit x-rays;
an x-ray detector positioned to receive x-rays emitted by said source; and
a computer operationally coupled to said source and detector, said detector comprising a reflector and a scintillator in optical communication with said reflector, both said reflector and said scintillator are fabricated from the same material wherein said material is milled to a sub micron size, and comprising at least one of $Y_{1.33}Gd_{0.66}Eu_{0.01}O_3$:Pr, $Gd_2(S,O)_2$:Ce,Tb, and $Lu_{0.8}Tb_{2.2}Al_5O_{12}$:Ce.

9. A system in accordance with claim 8 wherein said material of said reflector having at least one different physical property than said same material of said scintillator.

* * * * *